(12) United States Patent
Ahn et al.

(10) Patent No.: US 10,041,653 B2
(45) Date of Patent: Aug. 7, 2018

(54) BACKLIGHT UNIT OF DISPLAY APPARATUS AND DISPLAY APPARATUS

(71) Applicant: SAMSUNG ELECTRONICS CO., LTD., Suwon-si, Gyeonggi-do (KR)

(72) Inventors: Joon Seok Ahn, Suwon-si (KR); Jun-Mo Yoo, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 177 days.

(21) Appl. No.: 14/976,145

(22) Filed: Dec. 21, 2015

(65) Prior Publication Data

US 2017/0009960 A1    Jan. 12, 2017

(30) Foreign Application Priority Data

Jul. 6, 2015 (KR) .................. 10-2015-0095681

(51) Int. Cl.
| F21V 7/00 | (2006.01) |
| F21V 15/01 | (2006.01) |
| G02F 1/1335 | (2006.01) |
| F21Y 101/00 | (2016.01) |

(52) U.S. Cl.
CPC ............ F21V 15/01 (2013.01); F21V 7/0066 (2013.01); G02F 1/133603 (2013.01); G02F 1/133608 (2013.01); F21Y 2101/00 (2013.01); G02F 1/133605 (2013.01)

(58) Field of Classification Search
CPC ......... G02F 1/133605; G02F 1/133603; G02F 1/133608; F21V 15/01; F21V 7/0066
See application file for complete search history.

(56) References Cited

U.S. PATENT DOCUMENTS

| 2008/0094830 A1 | 4/2008 | Chang |
| 2009/0135331 A1 | 5/2009 | Kawase |
| 2011/0134629 A1* | 6/2011 | Kim ................. G02F 1/133608 362/97.1 |
| 2012/0099050 A1 | 4/2012 | Kasai et al. |
| 2012/0120325 A1 | 5/2012 | Shimizu |
| 2013/0188100 A1* | 7/2013 | Ikuta ....................... G02F 1/00 348/739 |
| 2013/0321717 A1* | 12/2013 | Kuromizu ......... G02F 1/133608 348/790 |
| 2014/0098563 A1 | 4/2014 | Kim et al. |

(Continued)

FOREIGN PATENT DOCUMENTS

| JP | 5228108 | 7/2013 |
| KR | 10-2006-0073866 | 6/2006 |

(Continued)

OTHER PUBLICATIONS

Communication under Rule 71(3) EPC dated May 11, 2016 in counterpart European Patent Application No. 16163012.4.

(Continued)

*Primary Examiner* — Karabi Guharay
(74) *Attorney, Agent, or Firm* — Nixon & Vanderhye P.C.

(57) ABSTRACT

A backlight unit for a display apparatus is disclosed. For example, the backlight unit including an integrated support for a display apparatus is disclosed. A disclosed example provides the backlight unit for a display apparatus including the integrated support which enables a thin display apparatus using the backlight unit including the integrated support.

18 Claims, 15 Drawing Sheets

(56) References Cited

U.S. PATENT DOCUMENTS

2014/0347840 A1    11/2014  Lee et al.
2015/0131264 A1*  5/2015  Ishizuka ........... G02F 1/133605
                                                                             362/97.1

FOREIGN PATENT DOCUMENTS

| KR | 10-2013-0004661 | 1/2013 |
| KR | 10-2013-0070772 | 6/2013 |
| KR | 10-2015-0073267 | 7/2013 |
| KR | 10-2014-0046525 | 4/2014 |
| KR | 10-2014-0137700 | 12/2014 |
| WO | 2009/072772 | 6/2009 |

OTHER PUBLICATIONS

Search Report dated Apr. 8, 2016 in counterpart International Application No. PCT/KR2015/013230.
Extended European Search Report dated Jul. 18, 2016 in counterpart European Patent Application No. 16163012.4.

* cited by examiner

BACKLIGHT UNIT OF DISPLAY APPARATUS AND DISPLAY APPARATUS

CROSS-REFERENCE TO RELATED APPLICATION

This application is based on and claims priority under 35 U.S.C. § 119 to Korean Patent Application No. 10-2015-0095681, filed on Jul. 6, 2015 in the Korean Intellectual Property Office, the disclosure of which is incorporated by reference herein in its entirety.

BACKGROUND

1. Field

The disclosure relates to a backlight unit of a display apparatus, and for example, to a backlight unit of a slim display apparatus.

2. Description of Related Art

Recently, screens of display apparatuses which display content have had high resolutions and large sizes. The display apparatus has become thinner and the display apparatus also has become lighter.

As the display apparatus has become thinner, an optical distance of a backlight unit should be constantly maintained to prevent an LED mura from occurring. The number of supporters may be increased for maintaining the constant optical distance, and an assembling process may be complicated.

SUMMARY

Aspects of the disclosure will be set forth in part in the description which follows and, in part, will be apparent from the description.

In accordance with one example of the disclosure, a backlight unit of a display apparatus includes a bottom chassis, a printed circuit board which is positioned on the bottom chassis, and on which light sources are mounted, a first reflecting sheet which is positioned on the printed circuit board and reflects light radiated from the light sources, and an integrated support which is positioned on the first reflecting sheet and includes a plurality of supporters which support a diffusion plate.

The backlight unit may further include a second reflecting sheet positioned on the integrated support and between the integrated support and the diffusion plate.

The light sources may protrude through first openings of the first reflecting sheet corresponding to the light sources, first openings of the integrated support corresponding to the light sources, and first openings of the second reflecting sheet corresponding to the light sources and may radiate light to the diffusion plate.

The integrated support may be formed using at least one of: vacuum forming and air pressure forming.

In accordance with another example of the disclosure, a backlight unit of a display apparatus includes a bottom chassis, a printed circuit board which is positioned on the bottom chassis, and on which light sources are mounted, a first reflecting sheet which is positioned on the printed circuit board and reflects light radiated from the light sources, and an integrated support which is positioned on the first reflecting sheet and includes a plurality of supporters which support a diffusion plate, wherein the integrated support may be formed using one of vacuum forming and air pressure forming.

In accordance with another example of the disclosure, a display apparatus includes a bottom chassis, a printed circuit board which is positioned on the bottom chassis, and on which light sources are mounted, a reflecting sheet which is positioned on the printed circuit board and reflects light radiated from the light sources, an integrated support which is positioned on the reflecting sheet and includes a plurality of supporters which support a diffusion plate, optical sheets positioned on the diffusion plate, a middle holder which supports the first reflecting sheet, the integrated support, and a second reflecting sheet, a display panel which displays content, a middle frame which supports the display panel, and a top chassis coupled to the bottom chassis.

The integrated support may be formed using at least one of: vacuum forming and air pressure forming.

In accordance with another example of the disclosure, a backlight unit of a display apparatus includes a bottom chassis, a first reflecting sheet positioned on the bottom chassis, an integrated support which is positioned on the first reflecting sheet and includes a plurality of supporters which support a diffusion plate, a printed circuit board on which light sources are mounted and which is positioned on the first reflecting sheet and includes openings corresponding to the plurality of supporters, and a second reflecting sheet which is positioned on the printed circuit board and reflects light radiated from the light sources.

The integrated support may be formed using at least one of: vacuum forming and air pressure forming.

In accordance with another example of the disclosure, a display apparatus includes a bottom chassis, a display panel which is disposed in front of the bottom chassis and displays content, a printed circuit board on which light sources, which radiate light to the display panel, are mounted, a diffusion plate which is disposed to be spaced apart from the light sources so that light radiated from the light sources pass through the diffusion plate, at least one reflecting sheet interposed between the bottom chassis and the diffusion plate to reflect light radiated from the light sources, and an integrated support which is in contact with the at least one reflecting sheet and includes a plurality of supporters which support the diffusion plate.

The at least one reflecting sheet and the integrated support may be one reflecting-sheet-integrated support.

The integrated support may be adhered to the at least one reflecting sheet.

The integrated support may be disposed on the at least one reflecting sheet.

The at least one reflecting sheet may be positioned on the integrated support, and the plurality of supporters may pass through the at least one reflecting sheet and protrude toward the diffusion plate.

The integrated support may be positioned on the printed circuit board.

A part of the integrated support may be positioned between the bottom chassis and the printed circuit board, and the plurality of supporters may pass through the printed circuit board and protrude toward an optical member.

The plurality of supporters may have a hollow shape.

The integrated support may be formed using at least one of: vacuum forming and air pressure forming.

BRIEF DESCRIPTION OF THE DRAWINGS

These and/or other aspects of the disclosure will become apparent and more readily appreciated from the following detailed description, taken in conjunction with the accompanying drawings, in which like reference numerals refer to like elements, and wherein.

DETAILED DESCRIPTION

Figure 1A:
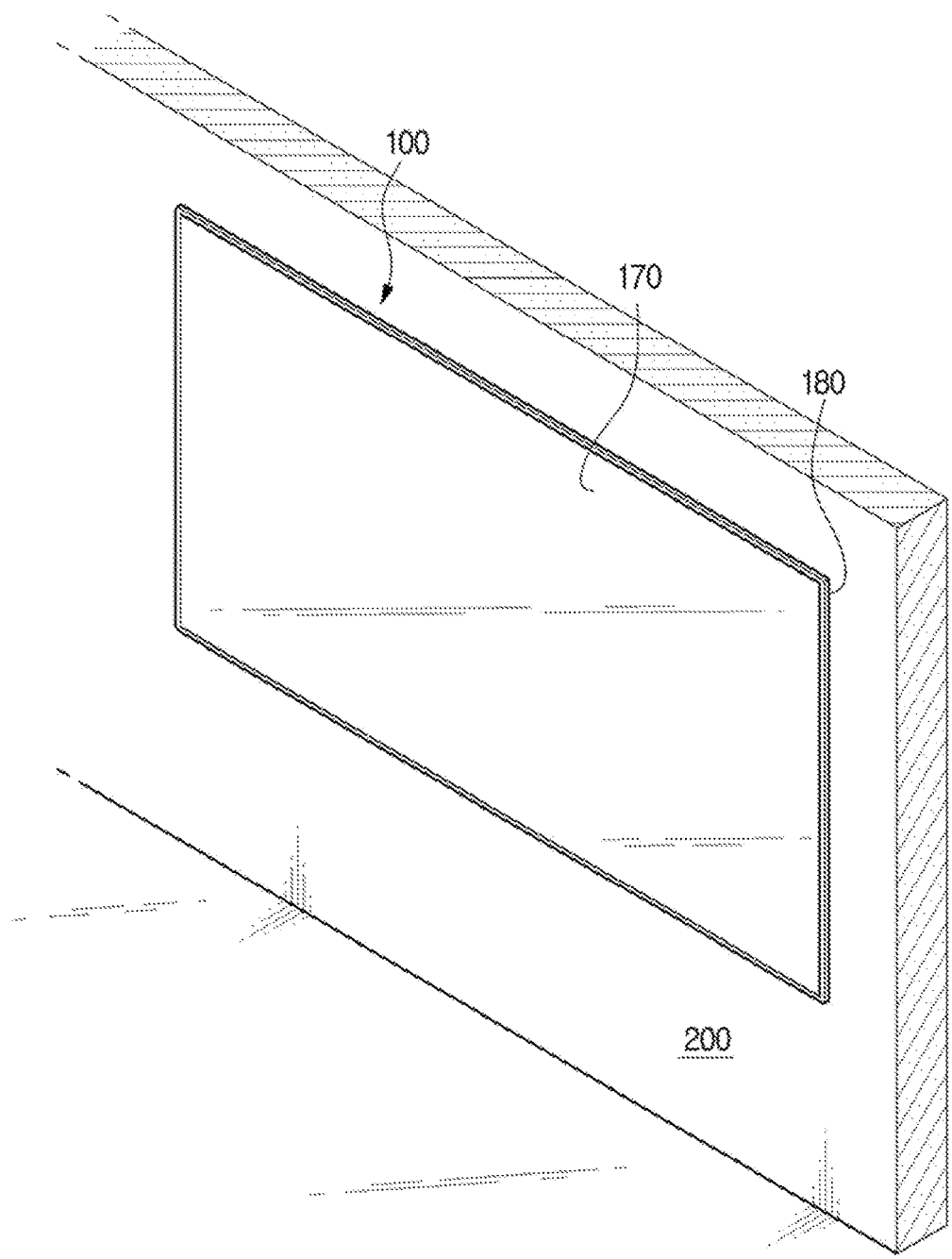
FIG. 1A is a schematic front perspective view illustrating an example display apparatus, which is fixed to a wall.

Example embodiments of the disclosure will be described with reference to accompanying drawings. In addition, methods of manufacturing and using the examples may be described with reference to the accompanying drawings. The same reference number substantially refers to a component performing the same function or the same component in the drawings.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the disclosure. As used herein, the term "and/or" includes any and all combinations of one or more of the associated listed items.

Content may be displayed on display apparatuses. For example, the content may include video files or audio files played by video players which are one of applications, music files played by music players, photo files displayed through photo galleries, web pages displayed through web browsers, or the like. In addition, the content may include received broadcasts.

In an example, a height of a component may be used as the same meaning as a width thereof. A height of a component may be used as the same meaning as a width thereof to correspond to axes of coordinates of the component.

The terminology used herein is for the purpose of describing example embodiments and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof. The same reference numbers will be used throughout this disclosure to refer to a member substantially performing the same function.

FIG. 1A is a schematic front perspective view illustrating an example display apparatus, which is fixed to a wall.

Figure 1B:
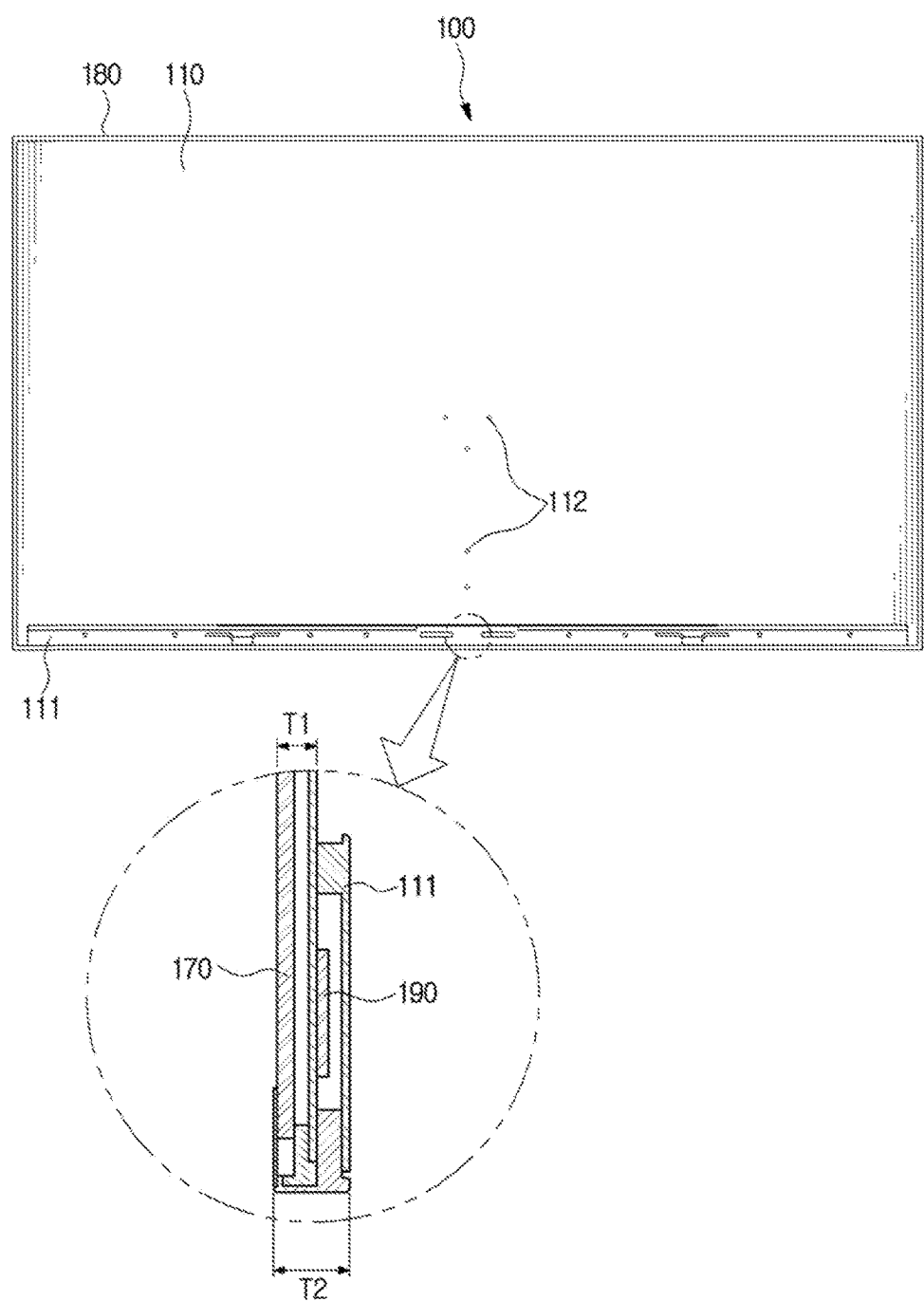
FIG. 1B is a schematic rear view illustrating the example display apparatus, which is fixed to the wall.

FIG. 1B is a schematic rear view illustrating the example display apparatus, which is fixed to the wall.

Referring to FIGS. 1A and 1B, a display apparatus 100 is fixed to a wall 200 by a wall mount unit (not shown).

The display apparatus 100 may include a display panel 170 which displays content, and a bottom chassis 110 which supports the display panel 170, and a top chassis 180. In addition, the display apparatus 100 may also include not only the above-described components, but also various components, such as, light sources 120 (see FIG. 2), reflecting sheets 130 (see FIG. 2), an integrated support 135 (see FIG. 2), a diffusion plate 145 (see FIG. 2), or a middle holder 140.

It may be readily understood by those skilled in the art that sizes and/or shapes of the components included in the display apparatus 100 can be changed to correspond to slimming of the display apparatus 100.

The display apparatus 100 may, for example, be one of output apparatuses which visually and/or aurally output content, and the display apparatus 100 having an LCD panel, an LED panel, an OLED panel, or the like may be installed on the wall 200 using the wall mount unit (not shown) due to its small thickness.

The display apparatus 100 may, for example, include an analog television (TV) set, a digital TV set, a three dimensional (3D) TV set, a smart TV, a light emitting diode (LED) TV set, an organic light emitting diode (OLED) TV set, a plasma TV set, a quantum dot TV set, a monitor, or the like. In addition, the display apparatus 100 may include a mobile phone, a smart phone, an MP3 player, a video player, a tablet PC, an electronic blackboard, a wearable apparatus which is wearable on a body, etc.

The display apparatus 100 may, for example, be implemented into not only a flat display apparatus, but also a curved display apparatus having a fixed curvature screen, a flexible display apparatus having a fixed curvature screen, a bended display apparatus having a fixed curvature screen, and/or a curvature variable display apparatus of which the curvature is variable based on an input, but is not limited thereto, and it may be readily understood by those skilled in the art.

Referring to FIG. 1B, a rear cover 111 may be coupled at a lower end of the rear surface (for example, a surface of the bottom chassis 110 which is couplable to the wall mount unit which is not shown) of the display apparatus 100. The rear cover 111 may be horizontally and detachably coupled to the rear surface of the display apparatus 100.

The rear cover 111 may be coupled to the rear surface of the display apparatus 100 parallel to one of an upper end and a lower end of the top chassis 180. In addition, the rear cover 111 may be coupled to the rear surface of the display apparatus 100 parallel to one of an upper end and a lower end of the bottom chassis 110.

The rear cover 111 may be coupled to the rear surface of the display apparatus 100 perpendicular to one of the left and the right of the top chassis 180. In addition, the rear cover 111 may be coupled to the rear surface of the display apparatus 100 perpendicular to one of the upper end and the lower end of the top chassis 180.

A thickness T2 of the display apparatus 100 including the rear cover 111 is greater than a thickness T1 of the display apparatus 100 except the rear cover 111. The thickness T1 of the display apparatus 100 except the rear cover 111 may, for example, be less than or equal to 50% of the thickness T2 of the display apparatus 100 including the rear cover 111. The thickness T1 of the display apparatus 100 except the rear cover 111 may, for example, be greater than 40% and less than 70% of the thickness T2 of the display apparatus 100 including the rear cover 111.

The thickness of the display apparatus 100 except the rear cover 111 may be the thickness T1 of the display apparatus 100. A thickness of which the bottom chassis 110 and the top chassis 180 are combined and the rear cover 111 is excepted may be the thickness of the display apparatus 100. For example, the thickness T1 of the display apparatus 100 except the rear cover 111 may be 5.4 mm. The thickness T1 of the display apparatus 100 except the rear cover 111 may be greater than 3.8 mm and less than 6.0 mm. The thickness T1 of the display apparatus 100 except the rear cover 111 may be greater than 3.5 mm and less than 6.5 mm. In addition, the thickness T1 of the display apparatus 100 except the rear cover 111 may be greater than 4.0 mm and less than 6.0 mm. The thickness T1 of the display apparatus 100 except the rear cover 111 may be changed to correspond to the slimming of the display apparatus 100, and it may be readily understood by those skilled in the art.

The rear cover 111 may not be coupled to the rear surface of the display apparatus 100 to correspond to the slimming of the display apparatus 100. In this case, the thickness T1 of the display apparatus 100 may be uniform. The thickness T1 of the display apparatus 100 may be greater than 3.8 mm and less than 6.0 mm. The thickness T1 of the display apparatus 100 may be greater than 3.5 mm and less than 6.5 mm. In addition, the thickness T1 of the display apparatus 100 may be greater than 4.0 mm and less than 6.0 mm.

In a flat display apparatus, the rear surface of the display apparatus 100 may be flat. A curvature of a rear surface of the bottom chassis 110 may be the same as that of the display panel 170.

In a curved display apparatus, the rear surface of the display apparatus 100 may be a curved surface. A curvature of the rear surface of the bottom chassis 110 may be the same as that of the display panel 170 of the curved display apparatus 100.

In the curved display apparatus, a curvature of the rear surface of the display apparatus 100 may be different from that of the display panel 170. For example, the curvature of the display panel 170 may be greater than that of the rear surface of the display apparatus 100 (for example, the curvature of the display panel 170 may be 2000 R and the curvature of the rear surface of the display apparatus 100 may be 3000 R), or the curvature of the display panel 170 may be the same as that of the rear surface of the display apparatus 100. In addition, the curvature of the display panel 170 may be less than that of the rear surface of the display apparatus 100 (for example, the curvature of the display panel 170 may be 3000 R and the curvature of the rear surface of the display apparatus 100 may be 2000 R).

Four or more video electronics standards association (VESA) holes or VESA mount holes 112 may be formed in the rear surface of the display apparatus 100 according to a VESA standard. A standard of the VESA hole 112 has width×height, and its unit is mm. The standard of the VESA hole 112 may include 50×20, 75×35, 75×75, 75×50, 100×100, 100×50, 200×100, 200×50, 200×200, or greater than or equal to 200×200. The VESA hole 112 may be formed in the rear surface of the display apparatus 100 in a polygon or "T" shape.

The wall mount unit (not shown) may be coupled to the VESA hole 112 by a coupling member (for example, a screw, a rivet, and the like) to be fixed to the display apparatus 100.

Four (not shown) or more VESA holes (not shown) may be also formed at the rear surface of the display apparatus 100 according to a non-VESA standard. The VESA holes (not shown) of the non-VESA standard may be formed in a polygon or "T" shape.

The wall mount unit (not shown) may be coupled to the VESA hole (not shown) of the non-VESA standard by the coupling member (for example, the screw, the rivet, and the like) to be fixed to the display apparatus 100.

The rear surface of the display apparatus 100 may be fixed to the wall 200 by magnetism. The rear surface of the display apparatus 100 and the coupling member (not shown) having the magnetism fixed to the wall 200 may be coupled to each other by the magnetism. The rear surface of the display apparatus 100 may be coupled to the wall 200 by the coupling member (not shown) having the magnetism.

Figure 2:
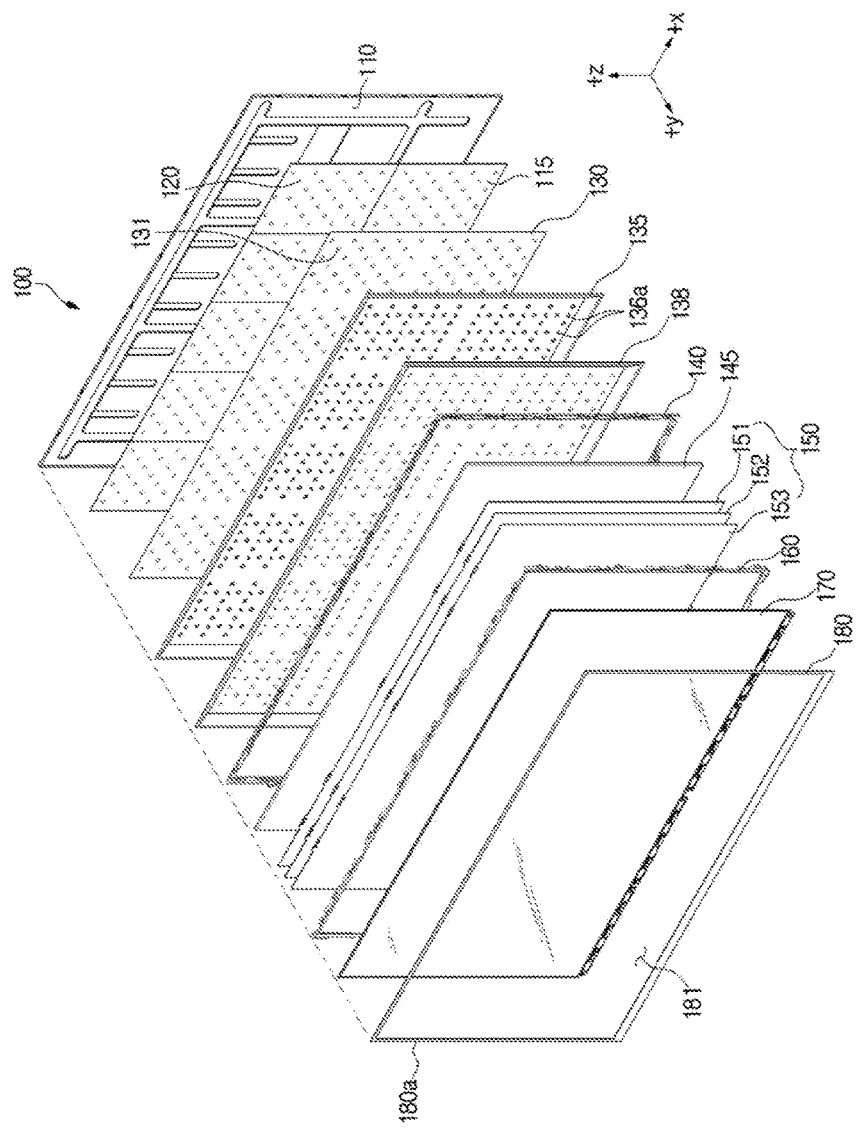
FIG. 2 is a schematic exploded perspective view illustrating an example display apparatus.

FIG. 2 is a schematic exploded perspective view illustrating an example display apparatus.

Figure 3:
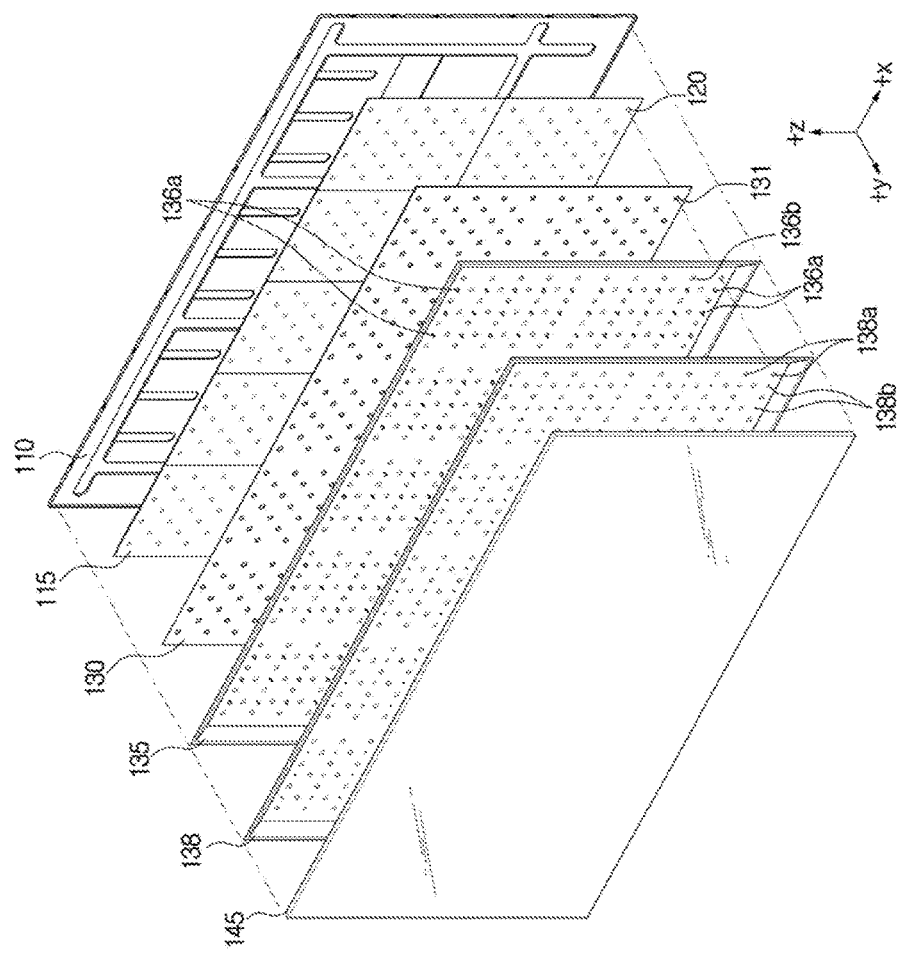
FIG. 3 is a schematic exploded perspective view illustrating an example backlight unit of a display apparatus.

FIG. 3 is a schematic exploded perspective view illustrating an example backlight unit of a display apparatus.

Referring to FIGS. 2 and 3, the display apparatus 100 includes the bottom chassis 110, a light source printed circuit board 115, the light sources 120, the reflecting sheet 130, the integrated support 135, the middle holder (e.g., which may, for example, be in the form of a holding frame) 140, the diffusion plate 145, optical sheets 150, a middle frame 160, the display panel 170, and the top chassis 180.

The light sources 120, the reflecting sheet 130, the diffusion plate 145, and the optical sheets 150 may, for example, refer to a backlight unit. The light source printed circuit board 115, the light source 120, the reflecting sheet 130, the diffusion plate 145, and the optical sheets 150 may, for example, refer to a backlight unit. In addition, the components except the bottom chassis 110, the middle holder 140, the middle frame 160, the display panel 170, the top chassis 180, and a printed circuit board 190 may, for example, refer to a backlight unit.

The bottom chassis 110 may, for example, support the light source printed circuit board 115 from the rear direction of the light source printed circuit board 115 on which the light sources 120 are mounted. The bottom chassis 110 may, for example, accommodate not only the light source printed circuit board 115, but also other components (for example, the reflecting sheet 130, the integrated support 135, the middle holder 140, the diffusion plate 145, the optical sheets 150, the middle frame 160).

The bottom chassis 110 may, for example, be formed to have a high strength and a polygonal plate shape, and include a metal material (for example, aluminum, or an aluminum alloy) which has a less heat deformation generated by a heat which is generated by the accommodated light sources and/or the display panel 170. The metal material may include light metals having specific gravity less than or equal to 4, for example, magnesium, beryllium, titanium, alkali metals, or alkali earth metals. The metal material may include nonferrous metals except an iron and an alloy which primarily has an iron.

The bottom chassis 110 may, for example, be formed of a plastic (for example, polycarbonate (PC)). In addition, the bottom chassis 110 may be formed of a plastic material to which glass fiber is added.

The light source printed circuit board 115 includes the plurality of light sources 120 mounted thereon. The light source printed circuit board 115 may include lenses 120*a* (see FIG. 5) which diffuse light radiated by the plurality of light sources 120. In addition, in an example, the light sources 120 may include the lenses 120*a*.

A size of the light source printed circuit board 115 may, for example, correspond to a size of the display panel 170. In addition, the light source printed circuit board 115 may include the plurality of light sources 120 and a set (for example, composed of a plurality of arrays) of light source bars (not shown) including the lenses 120*a* (see FIG. 5) corresponding to the plurality of light sources 120.

The light source bars (not shown) may be disposed in parallel to be spaced apart from each other on the rear surface (for example, a bottom thereof) of the bottom chassis 110 (for example, a direct type). The plurality of light source bars (not shown) may be disposed on the both side surfaces (for example, top/bottom side surfaces or left/right side surfaces) of the bottom chassis 110 (for example, an edge type). The plurality of light source bars may be disposed on one side surface (for example, one of top/bottom surfaces or left/right surfaces thereof) of the bottom chassis 110. In addition, the plurality of light source bars may be also disposed on all side surfaces of the bottom chassis 110 (for example, top/bottom/left/right surfaces thereof).

The light source printed circuit board 115 is electrically connected with a power supply unit (not shown) which supplies power to the display apparatus 100. Sets of the light source bars (not shown) are electrically connected with each other.

The light source 120 is mounted on the light source printed circuit board 115 and supported by a bottom of the bottom chassis 110. The light source 120 may irradiate with light using supplied power. The light source 120 irradiates the display panel 170 positioned at the front (for example, a +y direction) thereof with the light, and serves as a backlight in the display apparatus 100. The light source 120 may, for example, include a light emitting diode (LED) or a cold cathode fluorescent lamp (CCFL, not shown).

The light source 120 may be electrically connected with the light source printed circuit board 115.

When the light source bar (not shown) is positioned on at least one side surface of the bottom chassis 110, a light guide plate (not shown) may guide light radiated from the light source 120 to the display panel 170. The light guide plate (not shown) may be a transparent plastic material.

When the display panel 170 of the display apparatus 100 is an organic LED, there may be also no light source 120.

The reflecting sheet 130 facilitates light radiated from the light source 120 to be incident on the diffusion plate 145, or enables light reflected from the diffusion plate 145 to be re-incident on the diffusion plate 145. The reflecting sheet 130 is disposed at an upper portion of the light source 120 and/or the light source printed circuit board 115, and reflects leaked light to the display panel 170 to increase luminous efficiency.

The reflecting sheet 130 may be coated with a high reflective coating material (for example, silver, and TiO2) having a white or silver color. The reflecting sheet 130 may include a plurality of openings 131 corresponding to protrusions of the plurality of light sources 120 accommodated by the bottom chassis 110. The plurality of light sources 120 protruding from the openings 131 of the reflecting sheet 130 radiates light to the diffusion plate 145.

There may be one, or two or more reflecting sheets 130. When there are two reflecting sheets, a first reflecting sheet 130 may be positioned between the light source printed circuit board 115 and the integrated support 135, and a second reflecting sheet 138 may be positioned between the integrated support 135 and the diffusion plate 145. The second reflecting sheet 138 may include a plurality of first openings 138*a* corresponding to protrusions of the light sources 120, and second openings 138*b* corresponding to protrusions of supporters 136*a* in the integrated support 135. At least one of the first openings 138*a* and the second openings 138*b* of the second reflecting sheet 138 may be formed to correspond to a position of the integrated support 135. In addition, the reflecting sheet 130 may include a reflecting plate.

The integrated support 135 may support at least one of optical members 145 and 150. The integrated support 135 is positioned on the light source printed circuit board 115, and supports the diffusion plate 145 and/or the optical sheets 150. The integrated support 135 may be processed using vacuum forming or air pressure forming. The integrated support 135 may be a transparent or nontransparent material according to efficiency of light radiated from the light source 120.

A material of the integrated support 135 may, for example, include polyethylene terephthalate glycol, polyethylene, polystyrene, polypropylene, polystyrene paper, acrylonitrile butadiene styrene (ABS), or polycarbonate.

The integrated support 135 may be adhered to the reflecting sheets 130 and 138. In addition, the integrated support 135 may be coupled to the reflecting sheets 130 and 138 by an adhesive tape.

As the integrated support 135 is applied to the display apparatus 100, an assembly process may be simplified compared to when the bottom chassis 110 is independently assembled with a supporter (not shown). In addition, as the integrated support 135 is applied to the display apparatus 100, an assembly time may be reduced compared to the supporter (not shown) which is independently assembled. In addition, as the integrated support 135 is applied to the backlight unit of the display apparatus 100, an assembly process may be simplified compared to the supporter (not shown) which is independently assembled with the bottom chassis 110. In addition, as the integrated support 135 is applied to the backlight unit of the display apparatus 100, an assembly time may be reduced compared to the supporter (not shown) which is independently assembled.

The middle holder (e.g., which may, for example, be in the form of a holding frame) 140 may support the diffusion plate 145 and/or the optical sheets 150 using a plurality of middle holder protrusions (not shown), such as, for example, in a manner similar to the middle frame 160. The middle holder 140 may be accommodated in a plurality of corners (for example, four or three or less corners) of the bottom chassis 110. Light radiated from the light source 120 may be incident on the diffusion plate 145 and/or the optical sheets 150 without an interference of the middle holder 140.

The middle holder 140 may support the first reflecting sheet 130 and/or the second reflecting sheet 138 extended from the light source printed circuit board 115.

The diffusion plate 145 may substantially uniformly or uniformly diffuse light radiated from the light source 120 positioned under the diffusion plate 145. In addition, the diffusion plate 145 may support the optical sheets 150 positioned on the diffusion plate 145. The diffusion plate 145 uniformly or substantially uniformly diffuses light incident from the light source 120 and radiates the light to the optical sheets 150. The diffusion plate 145 may, for example, be formed of a transparent or nontransparent material. The diffusion plate 145 may, for example, comprise an acrylic material, a urethane material, an epoxy material, a polyester material, a polyamide material, a polystyrene material, or a polycarbonate material.

The optical sheets 150 may enable light which is radiated from the light source 120 and passes through the diffusion plate 145 to have uniform or substantially uniform brightness. The light which passes through the optical sheets 150 and has uniform or substantially uniform brightness is incident on the display panel 170.

The optical sheets 150 may, for example, include a plurality of sheets 151 to 153 which are overlapped by the middle holder protrusions (not shown). The optical sheets 151 to 153 may have optical sheet protrusions (not shown) corresponding to the middle holder protrusions (not shown). The optical sheets 150 may include a protective sheet, a prism sheet, or a diffuser sheet. The optical sheets 150 may have not only three sheets but also two, or four or more sheets.

The middle frame 160 is positioned under the display panel 170 and supports the display panel 170. In addition, the middle frame 160 may separate the display panel 170 positioned thereon from the optical sheet 150 positioned under the middle frame 160.

The middle frame 160 includes middle frame protrusions (not shown) for supporting the optical sheets 150. In addition, the middle frame 160 with the middle frame protrusions (not shown) and the middle holder protrusions (not shown) of the middle holder 140 may support the optical sheets 150.

A material of the middle frame 160 may, for example, include an acrylonitrile-butadiene-styrene resin (ABS) and/or a glass fiber. In addition, the middle frame 160 may, for example, include various plastics, a resin, and/or a metal material.

The display panel 170 may, for example, include a thin film transistor (TFT) substrate and liquid crystal display elements (LCDs). The display panel 170 may include the TFT substrate and active matrix organic light emitting diodes (AMOLEDs). In addition, the display panel 170 may include the TFT substrate and organic light emitting diodes (OLEDs). It may be easily understood to those skilled in the art that it is not limited to above-describe methods.

The display panel 170 may include a polarizer (not shown) and/or a color filter (not shown).

The printed circuit board 190 (see FIG. 1B) which generates a driving signal for driving the display panel 170 may be positioned at a lower end of the display panel 170. The printed circuit board 190 which generates a driving signal for driving the display panel 170 may be positioned at an upper end of the display panel 170. In addition, the printed circuit board 190 which generates a driving signal for driving the display panel 170 may be positioned at one of the left and the right of the display panel 170, or both of the left and right of the display panel 170.

The display panel 170 and the printed circuit board 190 may be electrically connected through a chip-on-film (not shown). The chip-on-film (not shown) may electrically connect the display panel 170 supported in the bottom chassis 110 and the printed circuit board 190 positioned at an outside of the bottom chassis 110. The printed circuit board 190 positioned at the outside of the bottom chassis 110 and a part of the chip-on-film (not shown) may not be exposed to the outside by the rear cover 111.

The chip-on-film (not shown) may electrically connect the display panel 170 supported in the bottom chassis 110 and the printed circuit board 190 positioned in the bottom chassis 110.

In addition, the display panel 170, the chip-on-film (not shown), and the printed circuit board 190 may be connected to each other in a direction of gravity action (for example, in a −z axis direction).

The middle frame 160 maybe positioned under the display panel 170.

The top chassis 180 is coupled to the bottom chassis 110 which accommodates the components 120 to 170 of the display apparatus 100. The top chassis 180 may be disposed at the front of the display apparatus 100, prevent the components 120 to 170 from being impacted from the outside, and/or prevent light radiated from the light source 120 therein from leaking to the outside (for example, an optical loss).

The top chassis 180 may be formed along a circumference of the display panel 170. The top chassis 180 may have a shape capable of covering edges of a top surface and a side surface of the display panel 170 (for example, a "⌐" shape). The top chassis 180 includes an opening 181. A front surface 180a of the four corners except the opening 181 of the top chassis 180 may refer to a bezel.

Content output from the display panel 170 may be provided through the opening 181. A part of an active area (not shown) and a black matrix area (not shown; for example, less than or equal to 3 mm from corners positioned in directions of the openings of the bezel) of the display panel 170 may be displayed through the opening 181. In addition, a part of the black matrix area (not shown; for example, less than or equal to 10 mm from corners positioned in directions of the openings of the bezel) may be displayed through the opening 181.

The narrower the width of the bezel 180a in the top chassis 180 is, the lighter and/or the smaller the display apparatus 100 may be. The narrower the width of the bezel 180a is, the higher the concentration degree to content displayed from the display apparatus 100 may be. In addition, the narrower the width of the bezel 180a in the top chassis 180 is, the wider, as much as the narrowed width of the bezel compared to the same display panel size, the screen may be provided to users.

Figure 4A:
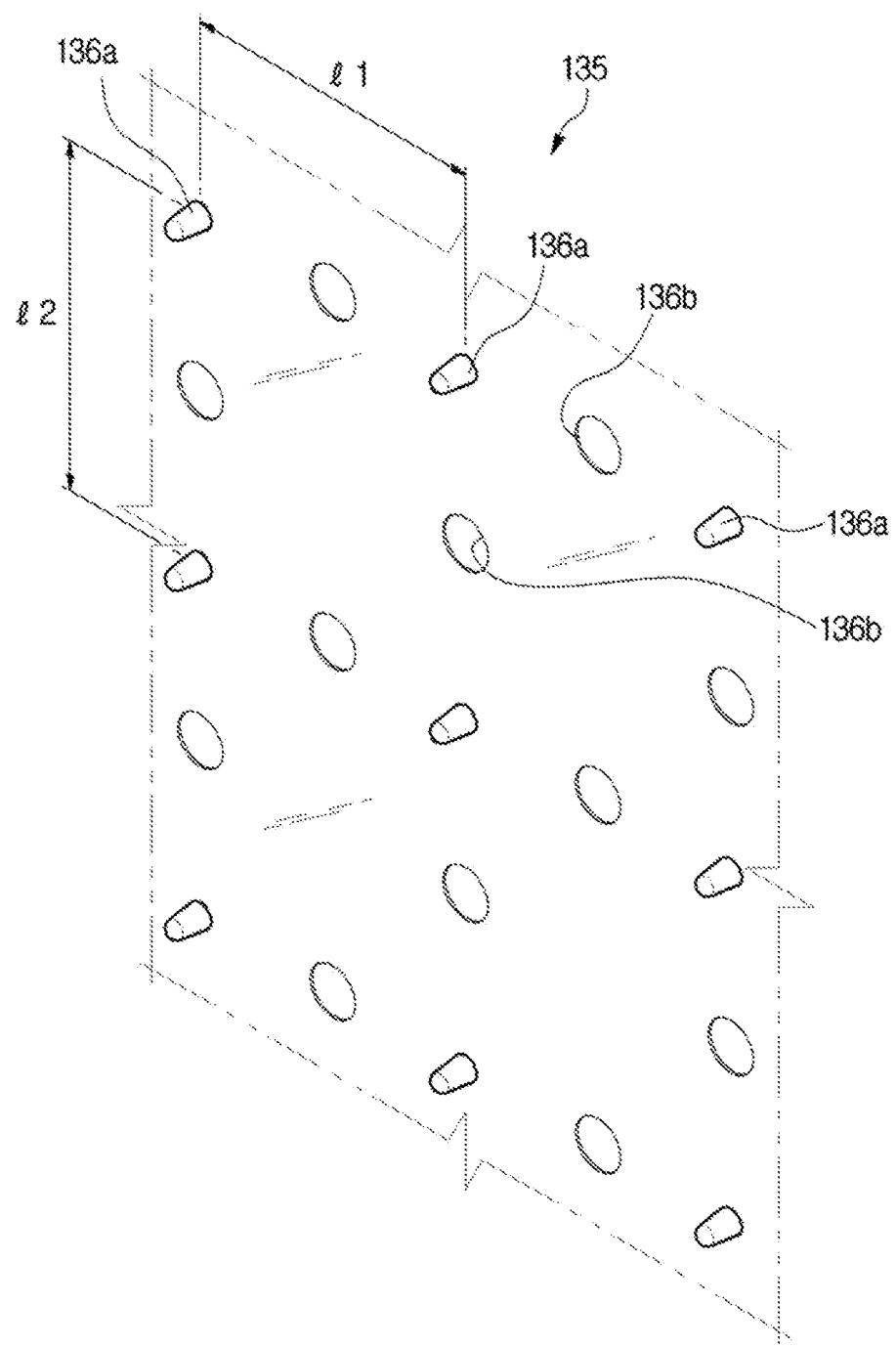
FIG. 4A is an enlarged perspective view illustrating an example integrated support of a backlight unit of a display apparatus.

FIG. 4A is an enlarged perspective view illustrating an example integrated support of an example backlight unit of a display apparatus.

Figure 4B:
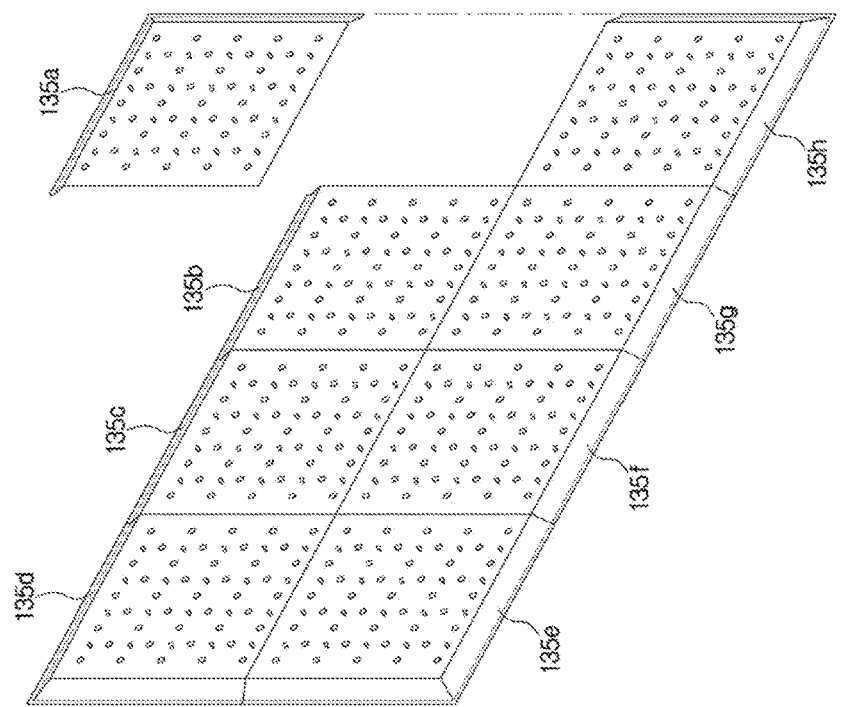
FIG. 4B is an enlarged view illustrating a set of example integrated supports of a backlight unit of a display apparatus.

FIG. 4B is an enlarged view illustrating a set of example integrated supports of an example backlight unit of a display apparatus.

Referring to FIGS. 4A and 4B, the integrated support 135 may, for example, comprising a thin film having a plurality of supporters (e.g., which may, for example, be in the form of a protrusion, or the like) 136a which support the diffusion plate 145. The integrated support 135 may include the plurality of supporters 136a arranged at a predetermined interval (for example, 35 mm, but it is changeable according to the size of the display apparatus 100).

In the integrated support 135, side surfaces of the plurality of supporters 136a and boundaries of circles of a bottom thereof may be extended and connected with each other. An inner portion of the supporter 136a may be formed in a hollow shape, for example, by vacuum forming or air pressure forming.

The integrated support 135 may include not only the supporters 136a but also a plurality of openings 136b corresponding to the light sources 120. One of the light sources 120 mounted on the light source printed circuit board 115 may pass through and protrude from the opening 131 of the reflecting sheet 130 and/or the openings 136b of the integrated support 135 positioned at the front (for example, in a +y axis direction) of the one of the light sources 120.

The supporter 136a may, for example, have a circular bottom surface and a pointed top which may be sharp. In addition, a region of the pointed top of the supporter 136a may be rounded to have a curvature (for example, greater than a curvature of the display panel 170).

A shape of the cross-section in a height direction of the supporter 136a may be a polygon such as a triangle, an ellipse such as a dome, or a semicircle. In addition, the shape of the cross-section in a height direction of the supporter 136a may be a tapered cross-section. For example, a diameter d2 of a bottom surface of the supporter 136a may be greater than a diameter d1 of a rounded region of the pointed top.

The integrated support 135 corresponding to the size of the display panel 170 may be processed through, for example, vacuum forming or air pressure forming. The integrated support 135 may include one integrated support 135 to correspond to the size of the display panel 170 (for example, greater than 80% and less than 100% of the size of the display panel 170).

The integrated support 135 may include a plurality of separated supporters 135a to 135h to correspond to the size of the display panel 170 (for example, eight supporters in which the size of each supporter is 12.5% of the size of the display panel 170).

The integrated support 135 may, for example, have a size of 400 mm (width)×a 400 mm (height). In addition, the integrated support 135 may have a size of 250 mm (width)× 250 mm (height), or a size of 300 mm (width)×300 mm (height). An array shape of a width×height of the supporter 136a in the integrated support 135 may have a square (for example, I1=I2), or rectangle (for example, I1≠I2).

In addition, in the integrated support 135, the supporter 136a may be spaced a predetermined distance from the openings 136b through which the light sources 120 pass (for example, the same interval from the left, right, upper, or lower openings 136b thereof).

A width of the integrated support 135 may be changed (for example, increase or decrease) and/or a height of the integrated support 135 may be changed (for example, increase or decrease), and it may be readily understood to those skilled in the art.

The integrated support 135 having a size of 400 mm (width)×400 mm (height), to correspond to the size of the display panel 170 may be arranged under the diffusion plate 145 (for example, an M×N array, where M and N are natural numbers). For example, when the size of the display panel 170 is 1600 mm×800 mm and a size of the integrated support 135 is 400 mm (width)×400 mm (height), the integrated support 135 may be disposed under the display panel 170 in a 4×2 array.

Figure 5:
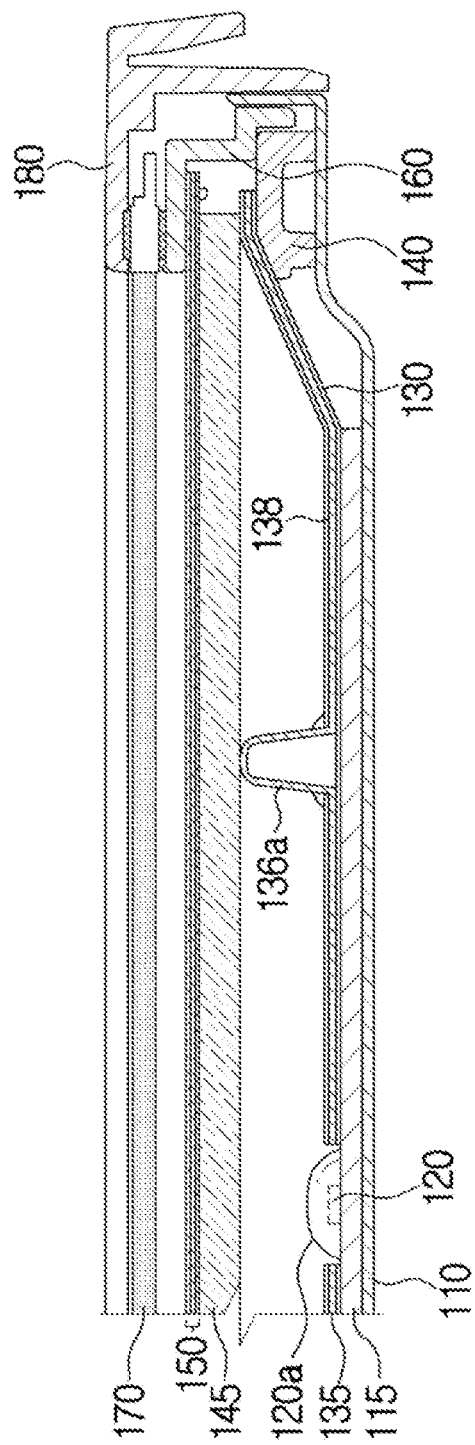
FIG. 5 is a cross-sectional view illustrating an example display apparatus.

FIG. 5 is a cross-sectional view illustrating an example display apparatus.

Figure 6:
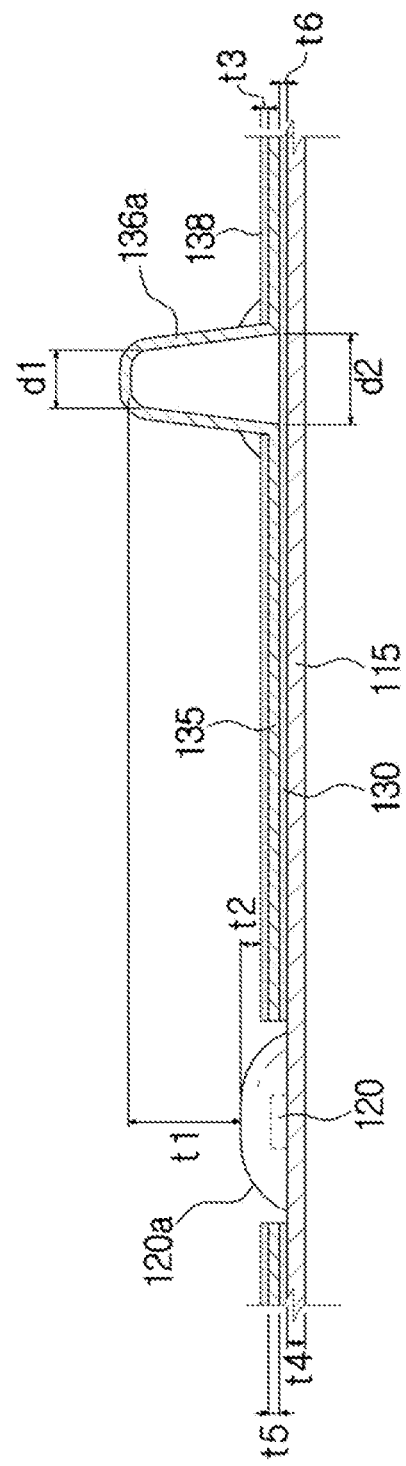
FIG. 6 is an enlarged cross-sectional view illustrating a part of an example backlight unit of a display apparatus.

FIG. 6 is an enlarged cross-sectional view illustrating a part of an example backlight unit of an example display apparatus.

Figure 7:
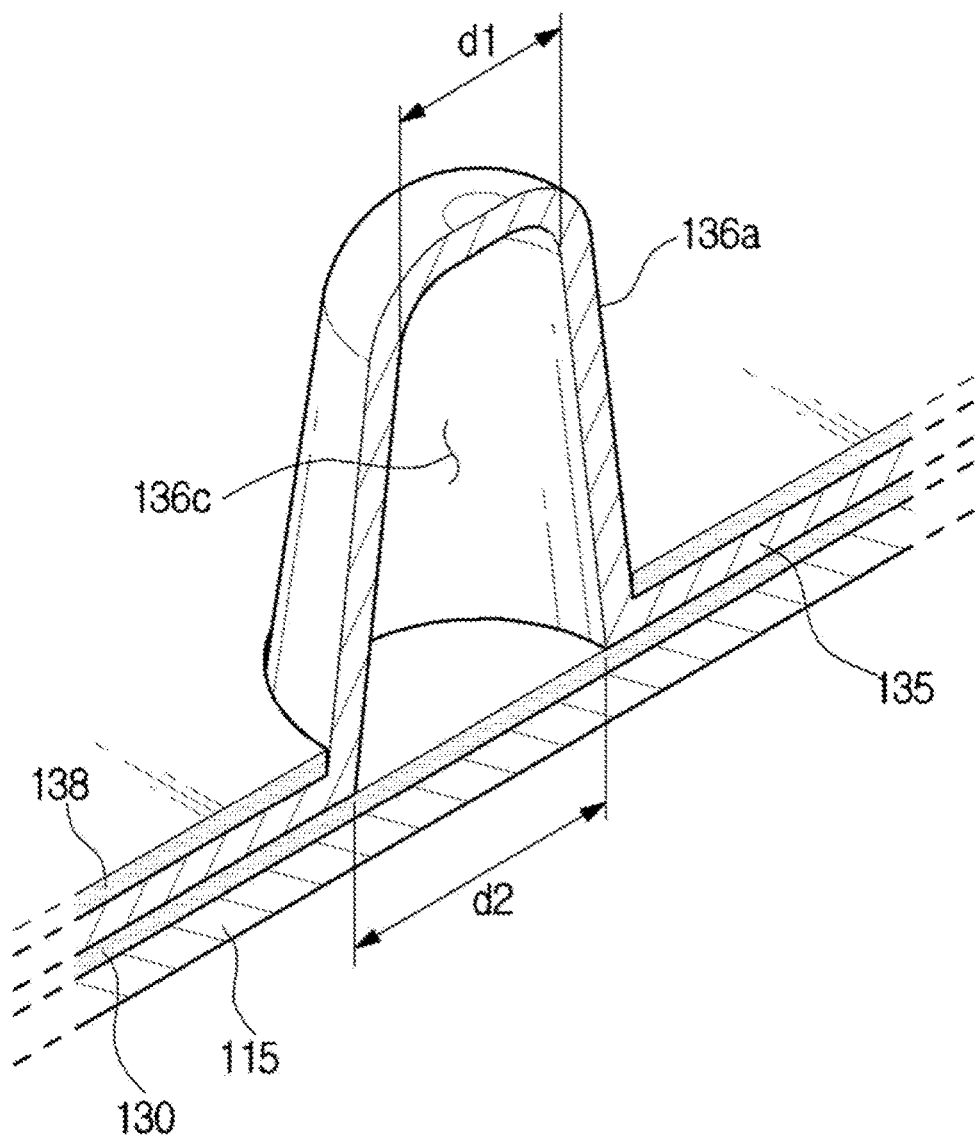
FIG. 7 is an enlarged cross-sectional view illustrating an example integrated support of a backlight unit.

FIG. 7 is an enlarged cross-sectional view illustrating an example integrated support of an example backlight unit.

Referring to FIGS. 5 to 7, the light source printed circuit board 115 is accommodated in the bottom chassis 110. The light sources 120 and the lenses 120a mounted on the light source printed circuit board 115 may be positioned on the bottom chassis 110. The first reflecting sheet 130 may be positioned on the light source printed circuit board 115. The light sources 120 protrude through the openings 131 of the first reflecting sheet 130.

The integrated support 135 may be positioned on the first reflecting sheet 130. The light sources 120 which protrude from the openings 131 of the first reflecting sheet 130 may protrude through the openings 136b of the integrated support 135. The second reflecting sheet 138 may be positioned on the integrated support 135. The light sources 120 which protrude from the openings 131 of the first reflecting sheet 130 and the openings 136b of the integrated support 135 may protrude through the first openings 138a of the second reflecting sheet 138. The supporters 136 of the integrated support 135 may protrude through the second openings 138b of the second reflecting sheet 138.

The light sources 120 which protrude from the openings 131 of the first reflecting sheet 130, the openings 136b of the integrated support 135, and the first openings 138a of the second reflecting sheet 138 radiate light to the diffusion plate 145. The supporters 136a of the integrated support 135 which protrude from the second openings 138b of the second reflecting sheet 138 support the diffusion plate 145 from under the diffusion plate 145. In addition, the supporters 136a of the integrated support 135 which protrude from the second openings 138b of the second reflecting sheet 138 support the diffusion plate 145 and the optical sheets 150 positioned on the diffusion plate 145.

Light which passes through the diffusion plate 145 and the optical sheets 150 having a uniform or substantially uniform brightness is incident to the display panel 170.

The middle holder 140 supports the first reflecting sheet 130, the integrated support 135, and the second reflecting sheet 138. In addition, the middle holder 140 may support a combination of the first reflecting sheet 130, the integrated support 135, and the second reflecting sheet 138.

The middle holder 140 may support the diffusion plate 145 and the optical sheets 150.

The middle frame 160 supports the display panel 170 from under the display panel 170. The middle frame 160 may be in contact with one (for example, 153 when there are three optical sheets) of the optical sheets 150.

The top chassis 180 is positioned on the display panel 170 and coupled to the bottom chassis 110.

Referring to FIGS. 6 and 7, a distance between the light source 120 and the diffusion plate 145 refers to an optical path distance. The optical path distance may be a distance between a top of the lens 120a and the diffusion plate 145. In addition, the optical path distance may refer to a light mixing area for light uniformity.

A distance between a top surface of the second reflecting sheet 138 and a bottom surface of the diffusion plate 145 may refer to the optical path distance. The distance between a top surface of the integrated support 135 and the bottom surface of the diffusion plate 145 may be a height (t1+t2+t3) of the supporter 136a.

The height of the supporter 136a is greater than that of the light source 120 (including the lens) based on a surface of the light source printed circuit board 115.

A thickness t6 of the first reflecting sheet 130 may be the same as a thickness t3 of the second reflecting sheet 138. The thickness t6 of the first reflecting sheet 130 may be the same as or different from a thickness t5 of the integrated support 135. The thickness t6 of the first reflecting sheet 130, the thickness t5 of the integrated support 135, and the thickness t3 of the second reflecting sheet 138 may be each less than or equal to 1 mm. For example, the thickness t6 of the first reflecting sheet 130 may be less than or equal to 1,000 μm and greater than or equal to 100 μm. The thickness t5 of the integrated support 135 may be less than or equal to 1,000 μm and greater than or equal to 100 μm. In addition, the thickness t3 of the second reflecting sheet 138 may be less than or equal to 1,000 μm and greater than or equal to 100 μm.

A thickness t4 of the light source printed circuit board 115 may be greater than at least one thickness of the thickness t6 of the first reflecting sheet 130, the thickness t5 of the integrated support 135, and the thickness t3 of the second reflecting sheet 138. In addition, the thickness t4 of the light source printed circuit board 115 may be less than a total (t3+t5+t6) of the thickness t6 of the first reflecting sheet 130, the thickness t5 of the integrated support 135, and the thickness t3 of the second reflecting sheet 138.

The backlight unit may be made thinner to correspond to the slimming of the display apparatus 100. The optical path distance may also be narrower to correspond to the slimming of the backlight unit. For example, when the thickness of the backlight unit is less than or equal to 10 mm to correspond to the slimming of the display apparatus 100, the optical path distance may be less than or equal to 5 mm.

The distance t1 from the bottom surface of the diffusion plate 145 to the top surface of the light source 120 (including the lens) may be less than or equal to 4 mm to correspond to the slimming of a thickness of the display apparatus 100. For example, the distance t1 from the bottom surface of the diffusion plate 145 to the top surface of the light source 120 (including the lens) may be less than or equal to 4 mm and greater than or equal to 2.5 mm. In addition, the distance t1 from the bottom surface of the diffusion plate 145 to the top surface of the light source 120 (including the lens) may be less than or equal to 3.5 mm and greater than or equal to 1.5 mm.

A diameter d1 of the supporter 136a of the integrated support 135 formed, for example, by vacuum forming or air pressure forming is less than a diameter of the openings 138b of the second reflecting sheet 138. A diameter d2 of the supporter 136a of the integrated support 135 formed, for example, by vacuum forming or air pressure forming may be less than or equal to the diameter of the openings 138b of the second reflecting sheet 138 (for example, by the thickness t5 of the integrated support 135).

An inner portion 136c of the supporter 136a of the integrated support 135 may, for example, be empty. The inner portion 136c of the supporter 136a of the integrated support 135 may be sealed by the first reflecting sheet 130.

Figure 8:
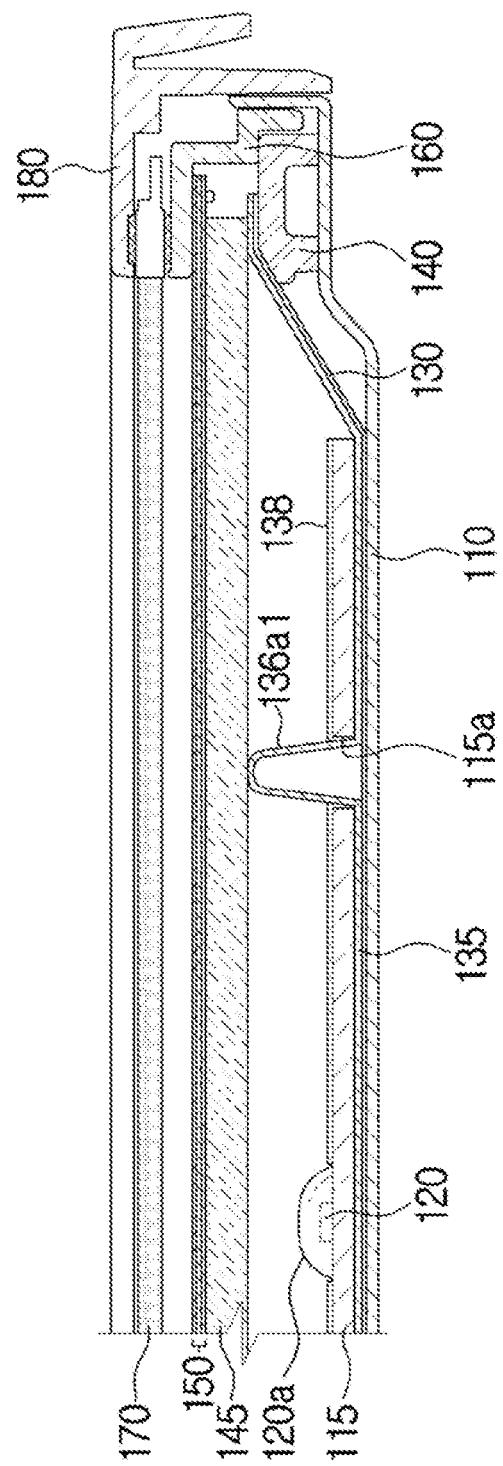
FIG. 8 is a cross-sectional view illustrating an example display apparatus.

FIG. 8 is a cross-sectional view illustrating an example display apparatus.

Figure 9:
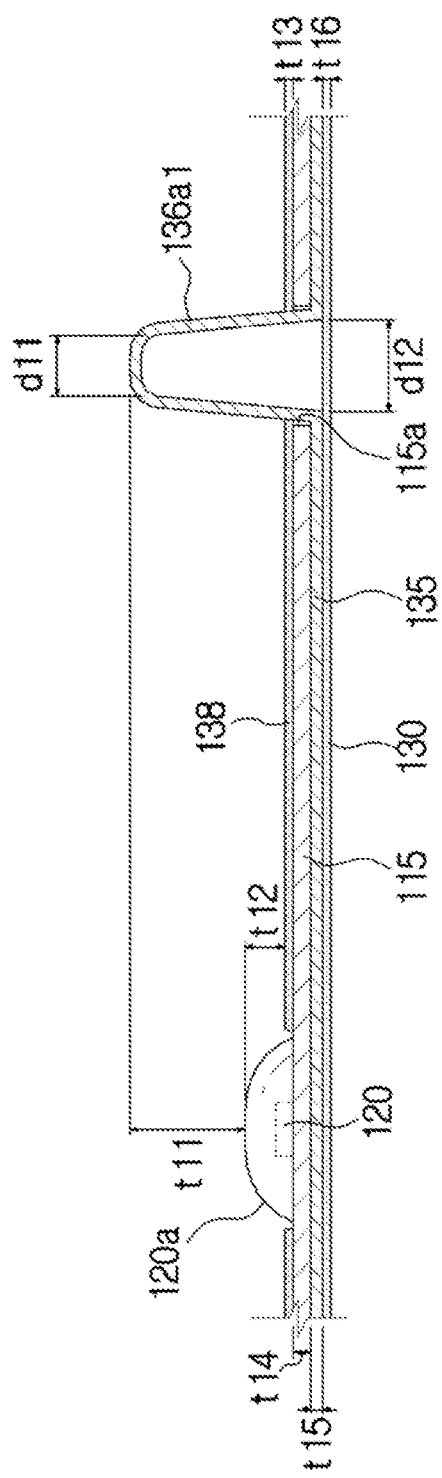
FIG. 9 is an enlarged cross-sectional view illustrating a part of an example backlight unit of a display apparatus.

FIG. 9 is an enlarged cross-sectional view illustrating a part of an example backlight unit of an example display apparatus.

Figure 10:
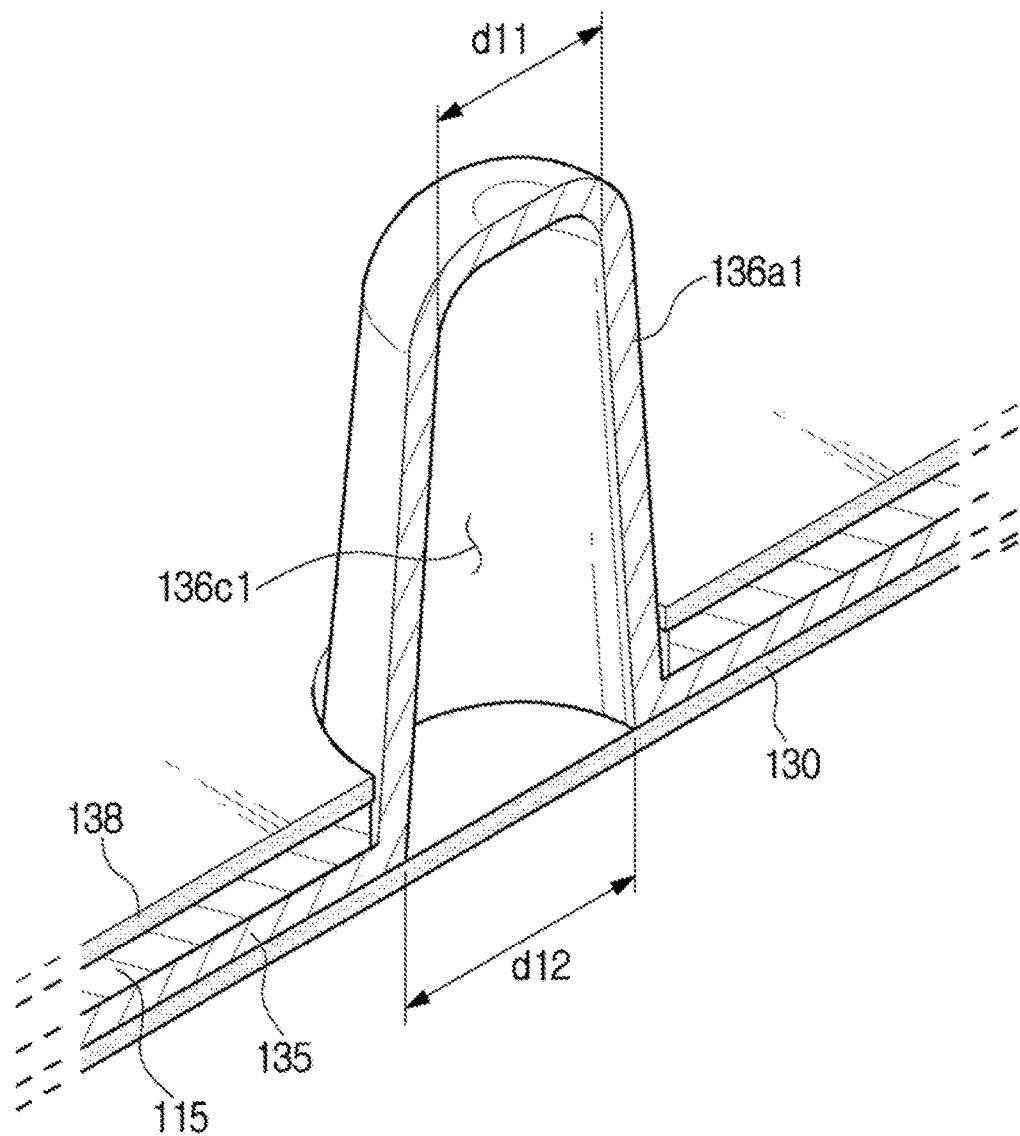
FIG. 10 is an enlarged cross-sectional view illustrating an example integrated support of a backlight unit.

FIG. 10 is an enlarged cross-sectional view illustrating an example integrated support of an example backlight unit.

Referring to FIGS. 8 to 10, a light source printed circuit board 115 is accommodated in a bottom chassis 110. A first reflecting sheet 130 may be positioned on the bottom chassis 110. An integrated support 135 may be positioned on the first reflecting sheet 130.

Light sources 120 and lenses 120a mounted on the light source printed circuit board 115 may be positioned thereon. When the integrated support 135 is positioned on the first reflecting sheet 130 and the light source printed circuit board 115 is positioned on the integrated support 135, the first reflecting sheet 130 may not include openings 131 corresponding to protrusions of the light sources 120.

Supporters 136a1 of the integrated support 135 protrude through openings 115a of the light source printed circuit board 115.

A second reflecting sheet 138 may be positioned on the light source printed circuit board 115.

The supporters 136a1 of the integrated support 135 which protrude from the openings 115a of the light source printed circuit board 115 may protrude through the second reflecting sheet 138.

The light sources 120 which protrude from openings 138a of the second reflecting sheet 138 radiate light to a diffusion plate 145. The light which passes through the diffusion plate 145 and optical sheets 150 and has uniform or substantially uniform brightness is incident to a display panel 170.

The supporters 136a1 of the integrated support 135 which protrude from the openings 115a of the light source printed circuit board 115 and second openings 138b of the second reflecting sheet 138 support the diffusion plate 145 from under the diffusion plate 145. In addition, the supporters 136a1 of the integrated support 135 which protrude from the openings 115a of the light source printed circuit board 115 and the second openings 138b of the second reflecting sheet 138 may support the diffusion plate 145 and the optical sheets 150 positioned on the diffusion plate 145.

A middle holder 140 supports the first reflecting sheet 130 and the integrated support 135. The middle holder 140 extends toward the first reflecting sheet 130, the integrated support 135, and the middle holder 140 supports a second reflecting sheet (not shown) positioned on the integrated support 135. In addition, the middle holder 140 may support a combination of the first reflecting sheet 130, the integrated support 135, and the second reflecting sheet 138.

The middle holder 140 may support the diffusion plate 145 and the optical sheets 150.

A middle frame 160 supports the display panel 170 from under the display panel 170. The middle frame 160 may be in contact with one (for example, 153 when there are three optical sheets) of the optical sheets 150.

A top chassis 180 is positioned on the display panel 170 and coupled to the bottom chassis 110.

Referring to FIGS. 9 and 10, a distance between the light source 120 and the diffusion plate 145 refers to an optical path distance. The optical path distance may be a distance between a top of the lens 120a and the diffusion plate 145. In addition, the optical path distance may refer to a light mixing area for light uniformity.

A distance between a top surface of the second reflecting sheet 138 and a bottom surface of the diffusion plate 145 may refer to the optical path distance (t11+t12). The distance between a bottom surface of the light source printed circuit board 115 and the bottom surface of the diffusion plate 145 may be a height (t11+t12+t13+t14) of the supporter 136a1.

The height of the supporter 136a1 is greater than that of the light source 120 (including the lens) based on the surface of the light source printed circuit board 115.

A thickness t16 of the first reflecting sheet 130 may be the same as a thickness t13 of the second reflecting sheet 138. The thickness t16 of the first reflecting sheet 130 may be the same as or different from a thickness t15 of the integrated support 135. The thickness t16 of the first reflecting sheet 130, the thickness t15 of the integrated support 135, and the thickness t13 of the second reflecting sheet 138 may be each less than or equal to 1 mm. For example, the thickness t16 of the first reflecting sheet 130 may be less than or equal to 1,000 µm and greater than or equal to 100 µm. The thickness t15 of the integrated support 135 may be less than or equal to 1,000 µm and greater than or equal to 100 µm. In addition, the thickness t13 of the second reflecting sheet 138 may be less than or equal to 1,000 µm and greater than or equal to 100 µm.

A thickness t14 of the light source printed circuit board 115 may be greater than at least one thickness of the thickness t16 of the first reflecting sheet 130, the thickness t15 of the integrated support 135, and the thickness t13 of the second reflecting sheet 138. In addition, the thickness t14 of the light source printed circuit board 115 may be less than a total (t13+t15+t16) of the thickness t16 of the first reflecting sheet 130, the thickness t15 of the integrated support 135, and the thickness t13 of the second reflecting sheet 138.

The backlight unit may be made thinner to correspond to the slimming of the display apparatus 100. The optical path distance should be also narrower to correspond to the slimming of the backlight unit. For example, when the thickness of the backlight unit is less than or equal to 10 mm to correspond to the slimming of the display apparatus 100, the optical path distance may be less than or equal to 5 mm.

The distance t11 from the bottom surface of the diffusion plate 145 to the top surface of the light source 120 (including the lens) may be less than or equal to 4 mm to correspond to the slimming of the display apparatus 100. For example, the distance t11 from the bottom surface of the diffusion plate 145 to the top surface of the light source 120 (including the lens) may be less than or equal to 4 mm and greater than or equal to 2.5 mm. In addition, the distance t11 from the bottom surface of the diffusion plate 145 to the top surface of the light source 120 (including the lens) may be less than or equal to 3.5 mm and greater than or equal to 1.5 mm.

A diameter d11 of the supporter 136a1 of the integrated support 135 may be formed by vacuum forming or air pressure forming is less than a diameter of the openings 138b of the second reflecting sheet 138. A diameter d12 of the supporter 136a1 of the integrated support 135 formed by vacuum forming or air pressure forming may be less than or equal to a diameter of the openings 138b of the second reflecting sheet 138 (for example, by the thickness t15 of the integrated support 135).

An inner portion 136c1 of the supporter 136a1 of the integrated support 135 may be empty. The inner portion 136c1 of the supporter 136a1 of the integrated support 135 may be sealed by the first reflecting sheet 130. The shape of the cross-section in a height direction of the supporter 136a1 may be a tapered cross-section. For example, a diameter d12 of a bottom surface of the supporter 136a1 may be greater than a diameter d11 of a rounded region of a pointed top.

Figure 11:
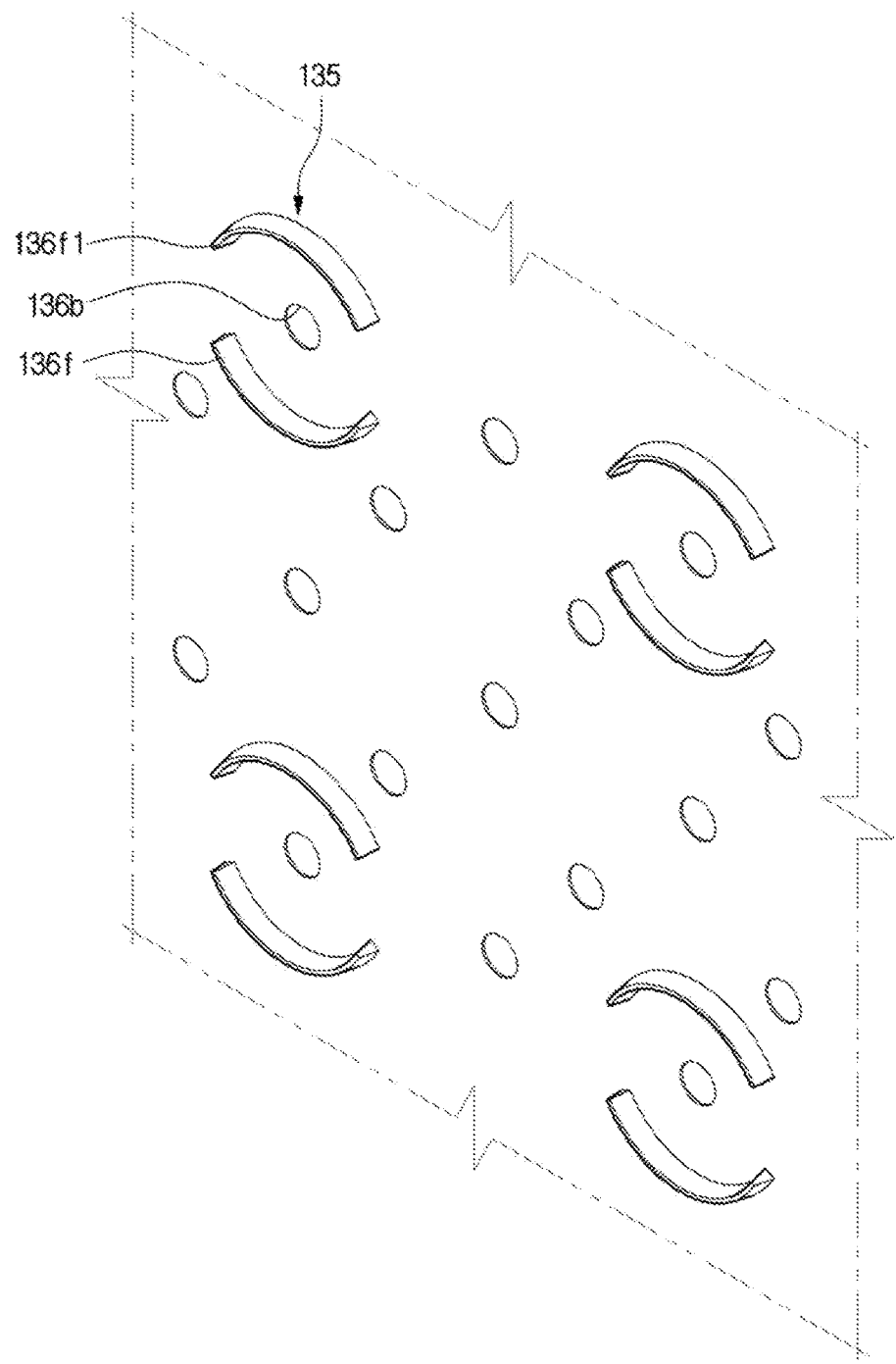
FIG. 11 is a cross-sectional view illustrating an example integrated support of a backlight unit of a display apparatus.

FIG. 11 is a cross-sectional view illustrating an example integrated support of an example backlight unit of an example display apparatus.

Referring to FIGS. 4A and 11, the integrated support 135 may, for example, be a thin film having a plurality of ring type or curved supporters 136f and 136/1 which support the diffusion plate 145. The ring type or curved supporters 136f and 136/1 may include the plurality of ring type supporters 136f and 136/1 arranged at a predetermined interval (for example, 35 mm, changeable to correspond to a size of the display apparatus 100).

In the integrated support 135, side surfaces of the plurality of supporters 136f and 136/1, and boundaries of circles of a bottom surface thereof may be extended and connected with each other. Inner portions of the ring type supporters 136f and 136/1 may be formed in a hollow shape, for example, by vacuum forming or air pressure forming.

The integrated support 135 may include not only the ring type or curved supporters 136f and 136/1 but also a plurality of openings 136b corresponding to penetration of the light sources 120. One of the light sources 120 mounted on the light source printed circuit board 115 may pass through and protrude from the opening 131 of the reflecting sheet 130 and/or the opening 136b of the integrated support 135 positioned at the front (for example, in a +y axis direction) of the one of the light sources 120.

The ring type supporters 136f and 136/1 may be provided with two independent semicircular supporters 136f and 136/1. Regions of pointed tops of the ring type supporters 136f and 136/1 may be formed in a round shape having a curvature (for example, greater than that of the display panel 170) or in a flat shape.

A shape of the cross-section in a height direction of the supporters 136f and 136/1 may be a polygon such as a parallelogram. In addition, the shape of the cross-section in the height direction of the supporters 136f and 136/1 may be a tapered cross-section. For example, a width of each bottom surface of the supporters 136f and 136/1 may be greater than a width of the rounded region of the pointed top.

The integrated support 135 having the ring type supporter 136f and 136/1 corresponding to a size of the display panel 170 may, for example, be processed through vacuum forming or air pressure forming. The integrated support 135 having the ring type supporters 136f and 136/1 may include one integrated support 135 to correspond to the size of the display panel 170 (for example, greater than 80% and less than 100% of the size of the display panel 170).

The integrated support 135 having the ring type supporters 136f and 136/1 may include a plurality of separated supporters (not shown) to correspond to the size of the display panel 170 (for example, eight supporters in which the size of each supporter is 12.5% of the size of the display panel 170).

The integrated support 135 including the ring type supporters 136f and 136/1 may have a size of 400 mm (width)× 400 mm (height). In addition, the integrated support 135 having the ring type supporters 136f and 136/1 may have a size of 250 mm (width)×250 mm (height), or a size of 300 mm (width)×300 mm (height).

The width of the integrated support 135 having the ring type supporters 136f and 136/1 may be changed (for example, increase or decrease) and/or the height of the integrated support 135 having the ring type supporters 136f and 136/1 may be changed (for example, increase or decrease), and it may be readily understood to those skilled in the art.

The integrated support 135 which has the ring type supporters 136f and 136/1, having a size of 400 mm (width)×400 mm (height) to correspond to the size of the display panel 170, may be arranged under the diffusion plate 145 (for example, an M×N array, where M and N are natural numbers). For example, when the size of the display panel 170 is 1600 mm×800 mm and a size of the integrated support 135 having the ring type supporters 136f and 136/1 is 400 mm (width)×400 mm (height), the integrated support 135 may be disposed at an lower end of the display panel 170 in a 4×2 array.

Figure 12:
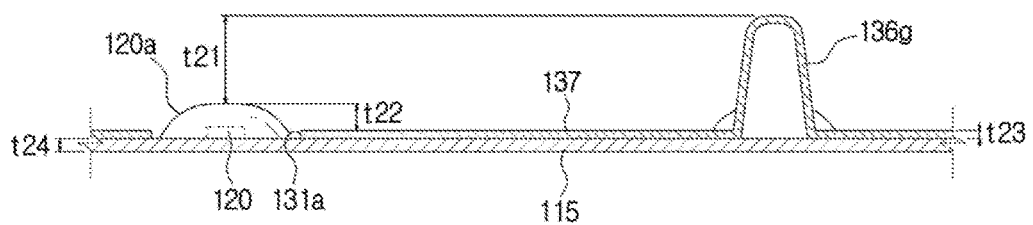
FIG. 12 is an enlarged cross-sectional view illustrating a part of an example backlight unit of a display apparatus.

FIG. 12 is an enlarged cross-sectional view illustrating a part of an example backlight unit of an example display apparatus.

Referring to FIGS. 12 and 6, the light source printed circuit board 115 is accommodated in the bottom chassis 110. The light sources 120 and the lenses 120a mounted on the light source printed circuit board 115 may be positioned on the light source printed circuit board 115 on the bottom chassis 110. A reflecting-sheet-integrated support 137 may be positioned on the light source printed circuit board 115. The light sources 120 protrude through openings 131a of the reflecting-sheet-integrated support 137. The reflecting-sheet-integrated support 137 reflects light and supports the diffusion plate 145.

The light sources 120 which protrude through the openings 131a of the reflecting-sheet-integrated support 137 radiate light to the diffusion plate 145. Supporters 136g of the reflecting-sheet-integrated support 137 support the diffusion plate 145 from under the diffusion plate 145. In addition, the supporters 136g of the reflecting-sheet-integrated support 137 may support the diffusion plate 145 and the optical sheets 150 positioned on the diffusion plate 145.

Light which passes through the diffusion plate 145 and the optical sheets 150 has a uniform or substantially uniform brightness and is incident to the display panel 170.

Since the middle holder 140, the diffusion plate 145, the optical sheet 150, the middle frame 160, the display panel 170, and the top chassis 180 in FIG. 12 are substantially similar to the middle holder 140, the diffusion plate 145, the optical sheet 150, the middle frame 160, the display panel 170, and the top chassis 180 in FIGS. 5 and 6 (for example, a difference of supporter), redundant descriptions will be omitted.

A distance between the light source 120 and the diffusion plate 145 refers to an optical path distance. The optical path distance may be a distance between a top of the lens 120a and the diffusion plate 145. In addition, the optical path distance may refer to a light mixing area for light uniformity.

A distance between a top surface of the reflecting-sheet-integrated support 137 and a bottom surface of the diffusion plate 145 may refer to the optical path distance (t21+t22). The optical path distance may be a height of the supporter 136g of the reflecting-sheet-integrated support 137.

A thickness t23 of the reflecting-sheet-integrated support 137 may be less than or equal to 1,000 μm and greater than or equal to 100 μm.

A thickness t24 of the light source printed circuit board 115 may be greater than the thickness t23 of the reflecting-sheet-integrated support 137. In addition, the thickness t24 of the light source printed circuit board 115 may be equal to or less than the thickness t23 of the reflecting-sheet-integrated support 137.

The backlight unit may be made thinner to correspond to the slimming of the display apparatus 100. The optical path distance should be also narrower to correspond to the slimming of the backlight unit. For example, when the thickness of the backlight unit is less than or equal to 10 mm to correspond to the slimming of the display apparatus 100, the optical path distance may be less than or equal to 5 mm.

The distance t21 from the bottom surface of the diffusion plate 145 to the top surface of the light source 120 (including the lens) may be less than or equal to 4 mm to correspond to the slimming of the display apparatus 100. For example, the distance t21 from the bottom surface of the diffusion plate 145 to the top surface of the light source 120 (including the lens) may be less than or equal to 4 mm and greater than or equal to 2.5 mm. In addition, the distance t21 from the bottom surface of the diffusion plate 145 to the top surface of the light source 120 (including the lens) may be less than or equal to 3.5 mm and greater than or equal to 1.5 mm.

Since only the reflecting-sheet-integrated support 137 is positioned on the light source printed circuit board 115 (for example, there is no reflecting sheet), the optical path distance (t21+t22) may be the shortest.

An inner portion of the supporter 136g of the reflecting-sheet-integrated support 137 is empty. The inner portion of the supporter 136g of the reflecting-sheet-integrated support 137 may be sealed by the light source printed circuit board 115.

Figure 13:
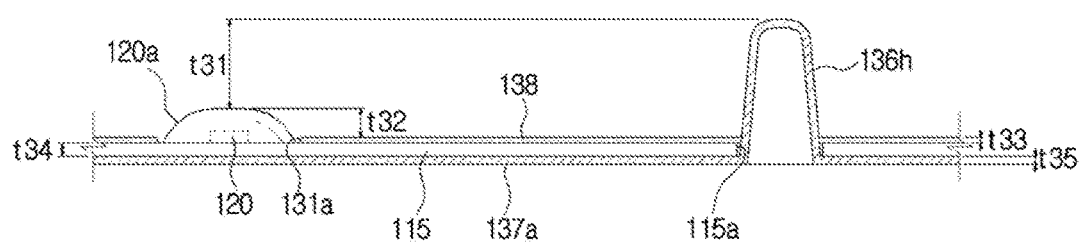
FIG. 13 is an enlarged cross-sectional view illustrating a part of an example backlight unit of a display apparatus.

FIG. 13 is an enlarged cross-sectional view illustrating a part of an example backlight unit of an example display apparatus.

Referring to FIGS. 13 and 9, a light source printed circuit board 115 is accommodated in a bottom chassis 110. A reflecting-sheet-integrated support 137a may be positioned on the bottom chassis 110. The light source printed circuit board 115 may be positioned on the reflecting-sheet-integrated support 137a.

Light sources 120 and lenses 120a mounted on the light source printed circuit board 115 may be positioned on the light source printed circuit board 115 on the reflecting-sheet-integrated support 137a. When the light source printed circuit board 115 is positioned on the reflecting-sheet-integrated support 137a, the reflecting-sheet-integrated support 137a may not include openings (not shown) corresponding to protrusions of the light sources 120.

Supporters 136h of the reflecting-sheet-integrated support 137a protrude through openings 115a of the light source printed circuit board 115.

A second reflecting sheet 138 may be positioned on the light source printed circuit board 115. The light sources 120 protrude through openings 131a of the second reflecting sheet 138.

The light sources 120 which protrude from the openings 131a of the reflecting-sheet-integrated support 137a radiate light to a diffusion plate 145. The supporter 136h of the reflecting-sheet-integrated support 137a supports the diffusion plate 145 from under the diffusion plate 145. In addition, the supporter 136h of the reflecting-sheet-integrated support 137a supports the diffusion plate 145 and optical sheets 150 positioned on the diffusion plate 145.

Light which passes through the diffusion plate 145 and the optical sheets 150 has a uniform or substantially uniform brightness and is incident to a display panel 170.

Since a middle holder 140, the diffusion plate 145, the optical sheets 150, a middle frame 160, the display panel 170, and a top chassis 180 in FIG. 13 are substantially similar to the middle holder 140, the diffusion plate 145, the optical sheet 150, the middle frame 160, display panel 170, and the top chassis 180 in FIGS. 8 and 9 (for example, a difference of supporter), redundant descriptions will be omitted.

A distance between the light sources 120 and the diffusion plate 145 refers to an optical path distance. The optical path distance may be a distance between a top of the lens 120a and the diffusion plate 145. In addition, the optical path distance may refer to a light mixing area for light uniformity.

A distance between a top surface of the second reflecting sheet 138 and a bottom surface of the diffusion plate 145 may refer to the optical path distance (t31+t32). A distance from a bottom surface of the light source printed circuit board 115 to a bottom surface of the diffusion plate 145 may be a height (t31+t32+t33+t34) of the supporter 136h of the reflecting-sheet-integrated support 137a.

The height of the supporter 136h of the reflecting-sheet-integrated support 137a is greater than a height of the light source 120 (including lens) based on a surface of the light source printed circuit board 115.

The thickness t33 of the second reflecting sheet 138 may be the same as or different from a thickness t35 of the reflecting-sheet-integrated support 137a.

The thickness t35 of the reflecting-sheet-integrated support 137a may be less than or equal to 1,000 μm and greater than or equal to 100 μm.

The thickness t34 of the light source printed circuit board 115 may be greater than the thickness t35 of the reflecting-sheet-integrated support 137a. In addition, the thickness t34 of the light source printed circuit board 115 may be equal to or less than the thickness t35 of the reflecting-sheet-integrated support 137a.

The backlight unit may be made thinner to correspond to the slimming of the display apparatus 100. The optical path distance should also be narrower to correspond to the slimming of the backlight unit. For example, when the thickness of the backlight unit is less than or equal to 10 mm to correspond to the slimming of the display apparatus 100, the optical path distance may be less than or equal to 5 mm.

The distance t31 from the bottom surface of the diffusion plate 145 to the top surface of the light source 120 (including the lens) may be less than or equal to 4 mm to correspond to the slimming of the display apparatus 100. For example, the distance t31 from the bottom surface of the diffusion plate 145 to the top surface of the light source 120 (including the lens) may be less than or equal to 4 mm and greater than or equal to 2.5 mm. In addition, the distance t31 from the bottom surface of the diffusion plate 145 to the top surface of the light source 120 (including the lens) may be less than or equal to 3.5 mm and greater than or equal to 1.5 mm.

Since only the second reflecting sheet 138 is positioned on the light source printed circuit board 115 and only the reflecting-sheet-integrated support 137a is positioned under the light source printed circuit board 115 (for example, there is no reflecting sheet), the optical path distance (t31+t32+t33) may be less than the optical path distance of the FIG. 6.

An inner portion of the supporter 136h of the reflecting-sheet-integrated support 137a may be empty.

As is apparent from the above description, a backlight unit of a display apparatus which enables a thin display apparatus using a backlight unit including an integrated support can be provided.

A backlight unit of a display apparatus which enables a short backlight unit assembly time using an integrated support can be provided.

A backlight unit of a display apparatus which enables a simplified backlight unit assembly process using an integrated support can be provided.

The disclosure is not limited to the foregoing examples, and according to the examples of the disclosure, a backlight unit of a display apparatus which enables a thin display apparatus using the backlight unit including an integrated support can be provided.

While the disclosure has been described with reference to examples illustrated above, it should be understood to those skilled in the art that various changes, substitutions and alterations may be made herein without departing from the technical scope of the disclosure.

Therefore, the spirit and scope of the disclosure are defined not by the example embodiments of the disclosure but by the appended claims, and encompass all equivalents that fall within the scope of the appended claims.

What is claimed is:

1. A backlight unit comprising:
    a bottom chassis;
    a printed circuit board including a plurality of light sources mounted thereon, the printed circuit board being disposed on the bottom chassis;
    a first reflecting sheet disposed on the printed circuit board and configured to reflect light radiated from the light sources;
    an integrated support including a sheet portion and a plurality of support structures, the plurality of support structures protruding from the sheet portion and being configured to support a diffusion plate; and
    a second reflecting sheet disposed on the integrated support,
    wherein at least a portion of the sheet portion of the integrated support is disposed between the first and second reflecting sheets.

2. The backlight unit of claim 1, further comprising:
    an optical sheet disposed on the diffusion plate; and
    a middle holder frame configured to support the first reflecting sheet, the integrated support, and the second reflecting sheet.

3. The backlight unit of claim 1, wherein the light sources protrude through first openings in the first reflecting sheet, the first openings arranged to accommodate the light sources, first openings of the integrated support arranged to accommodate the light sources, and first openings of the second reflecting sheet arranged to accommodate the light sources and to radiate light to the diffusion plate.

4. The backlight unit of claim 1, wherein the second reflecting sheet includes second openings arranged to accommodate the support structures of the integrated support.

5. The backlight unit of claim 1, wherein the support structures of the integrated support are arranged at a predetermined interval.

6. The backlight unit of claim 1, wherein a cross-section of the support structures of the integrated support includes one of: a polygon, an ellipse, and a semicircle.

7. The backlight unit of claim 1, wherein the light sources further comprise lenses, and a height of the support structures of the integrated support is greater than a height of the light source including the lens.

8. The backlight unit of claim 1, wherein the first reflecting sheet and the integrated support are integrally formed into a reflecting-sheet-integrated support, and the reflecting-sheet-integrated support is configured to reflect the light and supports the diffusion plate.

9. The backlight unit of claim 1, wherein the integrated support is formed using at least one of vacuum forming and air pressure forming.

10. A display apparatus comprising:
    a display panel configured to display content;
    a middle frame configured to support the display panel;
    a top chassis;
    a bottom chassis coupled to the top chassis;
    a printed circuit board on which a plurality of light sources are mounted the printed circuit board being disposed on the bottom chassis;
    a first reflecting sheet disposed on the printed circuit board and configured to reflect light radiated from the light sources;

an integrated support including a sheet portion and a plurality of support structures, the plurality of support structures extending from the sheet portion and being configured to support a diffusion plate;

an optical sheet disposed on the diffusion plate;

a middle holder frame configured to support the first reflecting sheet and the integrated support; and a second reflecting sheet, wherein at least a portion of the sheet portion of the integrated support is disposed between the first and second reflecting sheets.

11. A backlight unit comprising:

a bottom chassis;

a first reflecting sheet disposed on the bottom chassis;

an integrated support disposed on the first reflecting sheet and including a sheet portion and a plurality of support structures, the plurality of support structures extending from the sheet portion and being configured to support a diffusion plate a printed circuit board on which light sources are mounted, the printed circuit board being disposed on the integrated support and including openings arranged to accommodate the plurality of support structures; and a second reflecting sheet disposed on the printed circuit board and configured to reflect light radiated from the light sources, wherein at least a portion of the sheet portion of the integrated support is disposed between the first and second reflecting sheets.

12. The backlight unit of claim 11, further comprising:

an optical sheet disposed on the diffusion plate; and a middle holder frame configured to support the first reflecting sheet, the integrated support, and the second reflecting sheet.

13. The backlight unit of claim 11, wherein the light sources protrude through first openings of the second reflecting sheet and are configured radiate light to the diffusion plate.

14. The backlight unit of claim 11, wherein the second reflecting sheet includes second openings arranged to accommodate the support structures of the integrated support.

15. The backlight unit of claim 11, wherein the support structures of the integrated support are arranged at a predetermined interval.

16. The backlight unit of claim 11, wherein the light sources further include lenses, and a height of the support structures of the integrated support is greater than a height of the light source including the lens.

17. The backlight unit of claim 11, wherein a cross-section of the support structures of the integrated support includes one of a polygon, an ellipse, and a semicircle.

18. The backlight unit of claim 11, wherein the first reflecting sheet and the integrated support are integrally formed into a reflecting-sheet-integrated support, and the reflecting-sheet-integrated support is configured to reflect the light, wherein the plurality of support structures of the reflecting-sheet-integrated support protrude through the openings of the printed circuit board, and support the diffusion plate.

* * * * *